(12) United States Patent  
Billingsley et al.

(10) Patent No.: US 8,954,411 B2  
(45) Date of Patent: Feb. 10, 2015

(54) METHOD AND SYSTEM TO FACILITATE A SEARCH OF AN INFORMATION RESOURCE

(75) Inventors: Eric Noel Billingsley, Campbell, CA (US); Louis Marcel Gino Monier, Menlo Park, CA (US); Aditya Arora, Pleasanton, CA (US)

(73) Assignee: eBay Inc., San Jose, CA (US)

( * ) Notice: Subject to any disclaimer, the term of this patent is extended or adjusted under 35 U.S.C. 154(b) by 237 days.

(21) Appl. No.: 13/333,982

(22) Filed: Dec. 21, 2011

(65) Prior Publication Data

US 2012/0095975 A1    Apr. 19, 2012

Related U.S. Application Data

(63) Continuation of application No. 10/841,583, filed on May 7, 2004, now Pat. No. 8,090,698.

(51) Int. Cl.  
*G06F 7/00* (2006.01)  
*G06F 17/30* (2006.01)

(52) U.S. Cl.  
CPC ............................... *G06F 17/30864* (2013.01)  
USPC ....................................................... 707/705

(58) Field of Classification Search  
CPC ................... G06F 17/30864; G06F 17/30867; G06F 17/30067; G06F 17/30011; G06Q 30/02  
See application file for complete search history.

(56) References Cited

U.S. PATENT DOCUMENTS

| | | | |
|---|---|---|---|
| 5,032,987 A * | 7/1991 | Broder et al. ................. | 711/221 |
| 5,946,681 A | 8/1999 | Shorter | |
| 6,021,409 A * | 2/2000 | Burrows ............................... | 1/1 |
| 6,141,738 A * | 10/2000 | Munter et al. ................. | 711/206 |
| 6,154,738 A | 11/2000 | Call | |
| 6,216,123 B1 | 4/2001 | Robertson et al. | |
| 6,286,005 B1 | 9/2001 | Cannon | |
| 6,424,973 B1 | 7/2002 | Baclawski | |
| 6,556,987 B1 | 4/2003 | Brown et al. | |
| 6,564,197 B2 | 5/2003 | Sahami et al. | |
| 6,604,107 B1 | 8/2003 | Wang | |
| 6,735,586 B2 | 5/2004 | Timmons | |
| 6,799,174 B2 | 9/2004 | Chipman et al. | |
| 6,834,350 B1 | 12/2004 | Boroughs et al. | |
| 6,862,602 B2 * | 3/2005 | Guha ..................................... | 1/1 |

(Continued)

FOREIGN PATENT DOCUMENTS

EP        0381418 A2 *  1/1990  ............ G06F 15/411

OTHER PUBLICATIONS

"U.S. Appl. No. 10/841,583 Non-Final Office Action mailed Oct. 14, 2010", 15.

(Continued)

*Primary Examiner* — Ajay Bhatia  
*Assistant Examiner* — Jessica N Le  
(74) *Attorney, Agent, or Firm* — Schwegman, Lundberg & Woessner, P.A.

(57) ABSTRACT

Methods and systems to facilitate a search of an information resource is disclosed. In various embodiments, a distribution of a plurality of data items across a plurality of attribute value ranges corresponding to an attribute is identified. The attribute may be shared by at least two of the plurality of data items. Based on a determining that the distribution of the plurality of data items across the plurality of attribute value ranges includes at least two peaks, the distribution of the plurality of data items across the plurality of attribute value ranges corresponding to the attribute is communicated.

14 Claims, 17 Drawing Sheets

(56) References Cited

U.S. PATENT DOCUMENTS

| | | | |
|---|---|---|---|
| 6,904,435 B2 | 6/2005 | Jenkins et al. | |
| 6,963,867 B2 | 11/2005 | Ford et al. | |
| 7,043,494 B1 * | 5/2006 | Joshi et al. | 1/1 |
| 7,130,820 B2 | 10/2006 | Song | |
| 7,146,416 B1 | 12/2006 | Yoo et al. | |
| 7,165,119 B2 | 1/2007 | Fish | |
| 7,203,675 B1 | 4/2007 | Papierniak et al. | |
| 7,233,908 B1 | 6/2007 | Nelson | |
| 7,246,110 B1 | 7/2007 | Musgrove et al. | |
| 7,257,571 B2 | 8/2007 | Turski et al. | |
| 7,302,467 B2 | 11/2007 | Matsuda et al. | |
| 7,359,905 B2 | 4/2008 | Tunning et al. | |
| 7,386,535 B1 | 6/2008 | Kalucha et al. | |
| 7,539,636 B2 | 5/2009 | Madhavan et al. | |
| 7,567,970 B2 | 7/2009 | Chung | |
| 8,090,698 B2 | 1/2012 | Billingsley et al. | |
| 2001/0049671 A1 | 12/2001 | Joerg | |
| 2001/0054009 A1 | 12/2001 | Miller et al. | |
| 2002/0004735 A1 | 1/2002 | Gross | |
| 2002/0038304 A1 | 3/2002 | Gelfand | |
| 2002/0059202 A1 | 5/2002 | Hadzikadic et al. | |
| 2002/0059281 A1 * | 5/2002 | Watanabe et al. | 707/100 |
| 2002/0087558 A1 | 7/2002 | Bailey et al. | |
| 2002/0116382 A1 | 8/2002 | Koyama et al. | |
| 2002/0161690 A1 * | 10/2002 | McCarthy et al. | 705/37 |
| 2002/0188676 A1 | 12/2002 | Iai et al. | |
| 2003/0014396 A1 | 1/2003 | Kabra et al. | |
| 2003/0014483 A1 | 1/2003 | Stevenson et al. | |
| 2003/0020726 A1 | 1/2003 | Charpentier | |
| 2003/0050927 A1 | 3/2003 | Hussam | |
| 2003/0061243 A1 | 3/2003 | Kim | |
| 2003/0078915 A1 * | 4/2003 | chaudhuri et al. | 707/3 |
| 2003/0101124 A1 * | 5/2003 | Semret et al. | 705/37 |
| 2003/0105682 A1 * | 6/2003 | Dicker et al. | 705/27 |
| 2003/0131006 A1 * | 7/2003 | Monahan et al. | 707/10 |
| 2003/0131315 A1 | 7/2003 | Escher | |
| 2003/0172060 A1 | 9/2003 | Uchikado | |
| 2003/0187835 A1 | 10/2003 | Huret | |
| 2003/0212669 A1 | 11/2003 | Dedhia et al. | |
| 2004/0015416 A1 | 1/2004 | Foster et al. | |
| 2004/0019536 A1 | 1/2004 | Ashkenazi et al. | |
| 2004/0039598 A1 * | 2/2004 | Kim | 705/1 |
| 2004/0059740 A1 | 3/2004 | Hanakawa et al. | |
| 2004/0083453 A1 | 4/2004 | Knight et al. | |
| 2004/0088159 A1 | 5/2004 | Volponi | |
| 2004/0093354 A1 | 5/2004 | Xu et al. | |
| 2004/0133500 A1 | 7/2004 | Thompson et al. | |
| 2004/0153527 A1 | 8/2004 | Tosey | |
| 2004/0155898 A1 | 8/2004 | Taguchi et al. | |
| 2004/0190526 A1 * | 9/2004 | Kumar et al. | 370/395.21 |
| 2004/0199451 A1 * | 10/2004 | Benning et al. | 705/37 |
| 2004/0210491 A1 | 10/2004 | Sadri | |
| 2004/0254851 A1 | 12/2004 | Himeno et al. | |
| 2004/0267700 A1 * | 12/2004 | Dumais et al. | 707/2 |
| 2004/0267731 A1 | 12/2004 | Gino Monier et al. | |
| 2005/0027631 A1 * | 2/2005 | McAtee | 705/36 |
| 2005/0027694 A1 * | 2/2005 | Sauermann | 707/3 |
| 2005/0039111 A1 | 2/2005 | Abe et al. | |
| 2005/0075963 A1 * | 4/2005 | Balabon | 705/36 |
| 2005/0076772 A1 | 4/2005 | Gartland-Jones | |
| 2005/0080769 A1 | 4/2005 | Gemmell et al. | |
| 2005/0091183 A1 | 4/2005 | Cunningham et al. | |
| 2005/0120009 A1 | 6/2005 | Aker | |
| 2005/0177785 A1 * | 8/2005 | Shrader et al. | 715/513 |
| 2005/0192955 A1 | 9/2005 | Farrell | |
| 2005/0251510 A1 | 11/2005 | Billingsley et al. | |
| 2007/0288441 A1 | 12/2007 | Wolff et al. | |
| 2008/0015870 A1 | 1/2008 | Elowitz et al. | |
| 2008/0016059 A1 | 1/2008 | Henkin et al. | |
| 2008/0033787 A1 | 2/2008 | Keil et al. | |

OTHER PUBLICATIONS

"U.S. Appl. No. 10/841,583, Advisory Action mailed Feb. 26, 2008", 3 pgs.
"U.S. Appl. No. 10/841,583, Advisory Action mailed Apr. 10, 2007", 3 pgs.
"U.S. Appl. No. 10/841,583, Advisory Action mailed Jul. 8, 2010", 3.
"U.S. Appl. No. 10/841,583, Final Office Action mailed Jan. 5, 2007", 12 pgs.
"U.S. Appl. No. 10/841,583, Final Office Action mailed Oct. 22, 2009", 12 pgs.
"U.S. Appl. No. 10/841,583, Final Office Action mailed Nov. 30, 2007", 13 pgs.
"U.S. Appl. No. 10/841,583, Final Office Action mailed Apr. 28, 2010", 15 PGS.
"U.S. Appl. No. 10/841,583, Non Final Office Action mailed Apr. 14, 2011", 19 pgs.
"U.S. Appl. No. 10/841,583, Non Final Office Action mailed May 18, 2007", 12 pgs.
"U.S. Appl. No. 10/841,583, Non Final Office Action mailed May 27, 2008", 15 pgs.
"U.S. Appl. No. 10/841,583, Non Final Office Action mailed Jun. 29, 2006", 13 pgs.
"U.S. Appl. No. 10/841,583, Non Final Office Action mailed Dec. 9, 2009", 12 pgs.
"U.S. Appl. No. 10/841,583, Non-Final Office Action mailed May 26, 2009", 12 pgs.
"U.S. Appl. No. 10/841,583, Non-Final Office Action mailed Nov. 17, 2008", 11 pgs.
"U.S. Appl. No. 10/841,583, Notice of Allowance mailed Sep. 1, 2011", 13 pgs.
"U.S. Appl. No. 10/841,583, Pre-Appeal Brief Request filed Feb. 29, 2008", 5 pgs.
"U.S. Appl. No. 10/841,583, Response filed Jan. 11, 2011 to Non-Final Office Action received Oct. 14, 2010", 16 pgs.
"U.S. Appl. No. 10/841,583, Response filed Jan. 30, 2008 to Final Office Action mailed Nov. 30, 2007", 14 pgs.
"U.S. Appl. No. 10/841,583, Response filed Mar. 5, 2007 to Final Office Action mailed Jan. 5, 2007", 13 pgs.
"U.S. Appl. No. 10/841,583, Response filed Mar. 17, 2009 to Non-Final Office Action mailed Nov. 17, 2008", 11 pgs.
"U.S. Appl. No. 10/841,583, Response Filed Aug. 15, 2011 to Final Office Action Apr. 14, 2011", 15 pgs.
"U.S. Appl. No. 10/841,583, Response filed Aug. 25, 2008 to Non-Final Office Action mailed May 27, 2008", 15 pgs.
"U.S. Appl. No. 10/841,583, Response filed Aug. 26, 2009 to Non Final Office Action mailed May 26, 2009", 11 pgs.
"U.S. Appl. No. 10/841,583, Response filed Aug. 29, 2007 to Non-Final Office Action mailed May 18, 2007", 13 pgs.
"U.S. Appl. No. 10/841,583, Response filed Sep. 29, 2006 to Non Final Office Action mailed Jun. 29, 2006", 14 pgs.
"U.S. Appl. No. 10/841,583, Response filed Nov. 13, 2009 to Final Office Action mailed Oct. 22, 2009", 12 pgs.
"U.S. Appl. No. 10/841,583, Response filed Feb. 12, 2010 to Non Final Office Action mailed Dec. 9, 2009", 11 pgs.
"U.S. Appl. No. 10/841,583, Response filed Jun. 28, 2010 to Final Office Action mailed Apr. 28, 2010", 12 pgs.
Wu, et al., "Efficient Query Monitoruing Using Adaptive Multiple Key Hashin", ACM, (Nov. 2002), 477-484.

* cited by examiner

| SEARCH ENGINE 39 ||||
|---|---|---|---|
| SEARCH INDEX 17 || SEARCH TABLES 131 ||
| IDENTIFYING MODULE 138 | ANALYZING MODULE 140 | DETERMINING MODULE 142 | COMMUNICATION MODULE 144 |

*Fig. 3*

METHOD AND SYSTEM TO FACILITATE A SEARCH OF AN INFORMATION RESOURCE

CROSS REFERENCE TO RELATED APPLICATIONS

This application is a Continuation of U.S. application Ser. No. 10/841,583, entitled "METHOD AND SYSTEM TO FACILITATE A SEARCH OF AN INFORMATION RESOURCE," filed on May 7, 2004 and issued on Jan. 2, 2012 as U.S. Pat. No. 8,090,698, which is incorporated herein by reference in its entirety.

FIELD OF THE INVENTION

An embodiment relates generally to the technical field of search automation and, in one exemplary embodiment, to a method and system to facilitate a search of an information resource.

BACKGROUND OF THE INVENTION

A search engine is a tool that identifies data items in a database. A search engine will respond to a search request by returning search results that include such data items. Sometimes a search result will include a staggering number of data items all of which are responsive to the search request but most of which are not helpful. Indeed, finding a valuable data item in a large search result may sometimes be quite difficult. Often a user will manually process a set of data items to find a valuable data item by scanning multiple web pages of a search result and analyzing individual data items. Sometimes the number of data items prohibits manual processing by a user because the task cannot be completed in a reasonable amount of time.

SUMMARY OF THE INVENTION

A method to facilitate a search of an information resource includes, identifying a plurality of data items within the information resource and determining a respective attribute value corresponding to a first attribute for each data item to generate a plurality of attribute values. The plurality of attribute values are analyzed to identify a distribution of the plurality of data items based on a predetermined range of attribute values for the first attribute. A determination is made regarding whether the identified distribution of the plurality of data items facilitates the search of the information resource.

BRIEF DESCRIPTION OF THE DRAWINGS

The present invention is illustrated by way of example and not limitation in the figures of the accompanying drawings, in which like references indicate similar elements and in which:

FIG. 3 is a block diagram illustrating a search engine, according to an exemplary embodiment of the present invention;

DETAILED DESCRIPTION

A method and system to facilitate a search of an information resource are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a system that facilitates a search of an information resource. In various embodiments, a distribution of a plurality of data items across a plurality of attribute value ranges corresponding to an attribute is identified. The attribute may be common to at least two of the plurality of data items. Based on a determining that the distribution of the plurality of data items across the plurality of attribute value ranges includes at least two peaks, the distribution of the plurality of data items across the plurality of attribute value ranges corresponding to the attribute is communicated.

In various embodiments, the system receives a search request from a user and generates a search result by identifying data items that are responsive to the search request. Each data item in the search result may be characterized with one or more attributes. For example, a price, an author, or a subject may be attributes that characterize a book. Next, the system analyzes the attribute values of the data items to identify one or more distributions of data items. For example, three distributions of data items may be generated for a book based on the above-mentioned three attributes. A distribution may reflect a count of the number data items for a predetermined attribute value (e.g., for the attribute Author—Steinbeck, Poe, Twain, etc.) or range of attribute values (e.g., for the attribute price—$1.00 to $4.99, $5.00-$9.99, $10.00-$14.99 etc.).

Next, the system determines which identified distributions may facilitate (or aid) additional searching of the information resource and which distributions may not facilitate additional searching. Distributions that do not facilitate additional searching may include for example a flat distribution, a distribution without modes or peaks or a single mode distribution. For example, an identified distribution for price may not facilitate additional searching because all of the books in the search result are in the same $5.00-$9.99 price range. Finally, the system may present one or more distributions that facilitate additional searching by displaying the distribution to the user in graphical or numeric form (e.g., histogram, pie chart, frequency counts, etc.). Other embodiments may display the distribution to the user as an attribute selector that enables the user to further filter the search results by selecting an attribute value (e.g., for the attribute Author—Steinbeck, Poe, Twain, etc.).

Figure 1:
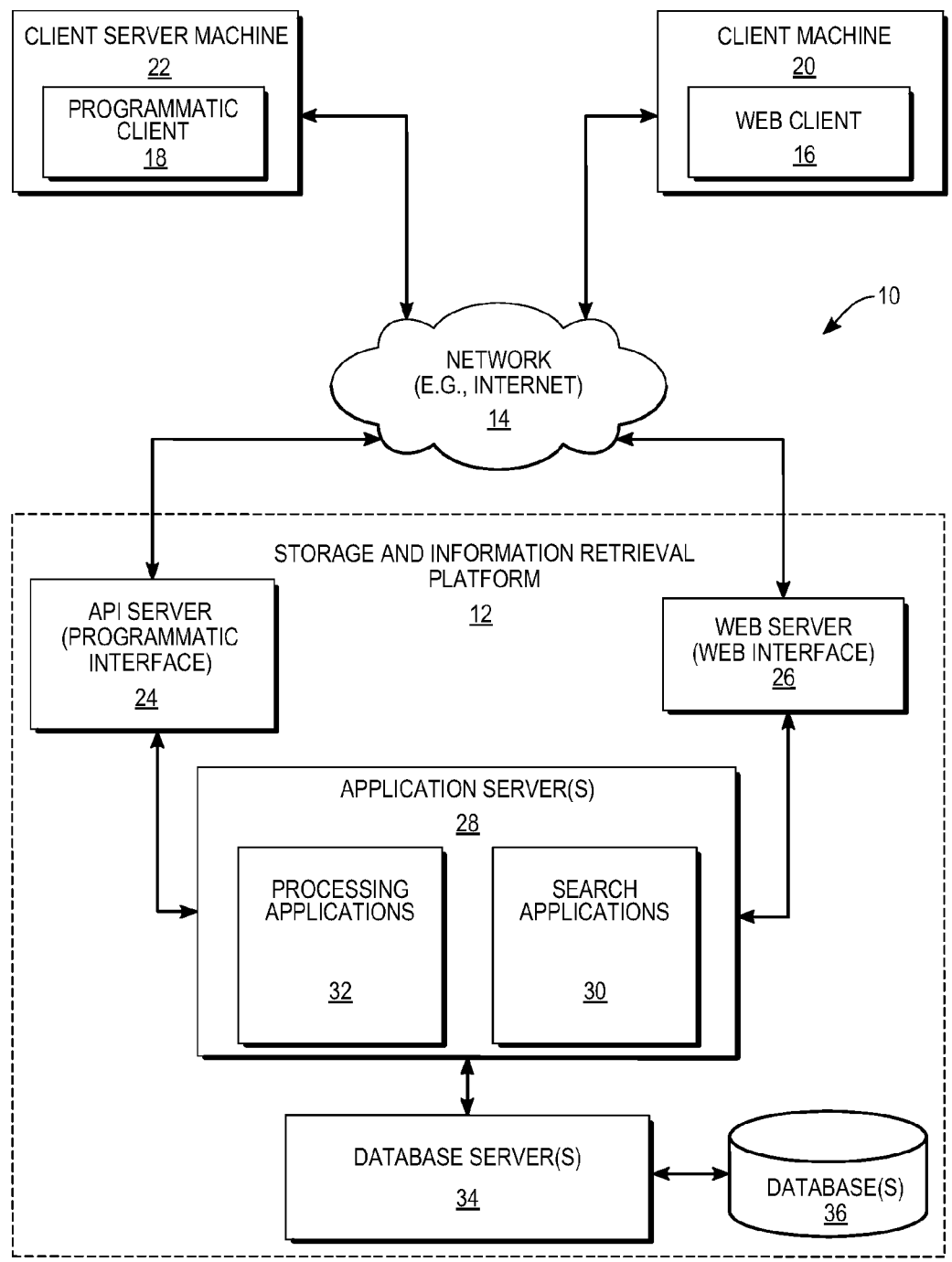
FIG. 1 is a network diagram depicting a system, according to one exemplary embodiment of the present invention.

FIG. 1 is a network diagram depicting a system 10, according to one exemplary embodiment of the present invention, having a client-server architecture. A platform, in the exemplary form of an information storage and retrieval platform 12, provides server-side functionality, via a network 14 (e.g., the Internet) to one or more clients. FIG. 1 illustrates, for example, a web client 16 (e.g., a browser, such as the INTERNET EXPLORER browser developed by Microsoft Corporation of Redmond, Wash. State), and a programmatic client 18 executing on respective client machines 20 and 22.

Turning specifically to the information storage and retrieval platform 12, an Application Program Interface (API) server 24 and a web server 26 are coupled to, and provide programmatic and web interfaces respectively to, one or more application servers 28. The application servers 28 host one or more processing applications 30 and search applications 32. The application servers 28 are, in turn, shown to be coupled to one or more databases servers 34 that facilitate access to one or more databases 36.

The processing applications 32 provide a number of functions and services to users that access the information storage and retrieval platform 12. The search applications 30 likewise provide a number of search services and functions to users. The processing applications 32 allow users to add, delete and modify data items with respect to the databases 36. A data item may be any recognizable discrete unit of information including a document, a web page, a book, a service, a real estate parcel, etc. Each data item may be described by attribute values that may be numeric or text. For example, a numeric attribute for a book may include its price. The corresponding attribute value may include any one of a range of values (e.g., $1 to $5). An example of a text attribute for the book may include its title and the corresponding attribute value may include the string, "Palm Pilot". The search applications 30 allow users to identify and display data items of interest.

Further, while the system 10 shown in FIG. 1 employs a client-server architecture, the present invention is of course not limited to such an architecture, and could equally well find application in a distributed, or peer-to-peer, architecture system. The various search and processing applications 30 and 32 could also be implemented as standalone software programs, which do not necessarily have networking capabilities.

The web client 16, it will be appreciated, accesses the various search and processing applications 30 and 32 via the web interface 26 supported by the web server 26. Similarly, the programmatic client 18 accesses the various services and functions provided by the search and processing applications 30 and 32 via the programmatic interface provided by the API server 24.

Search Architecture and Applications

Figure 2:
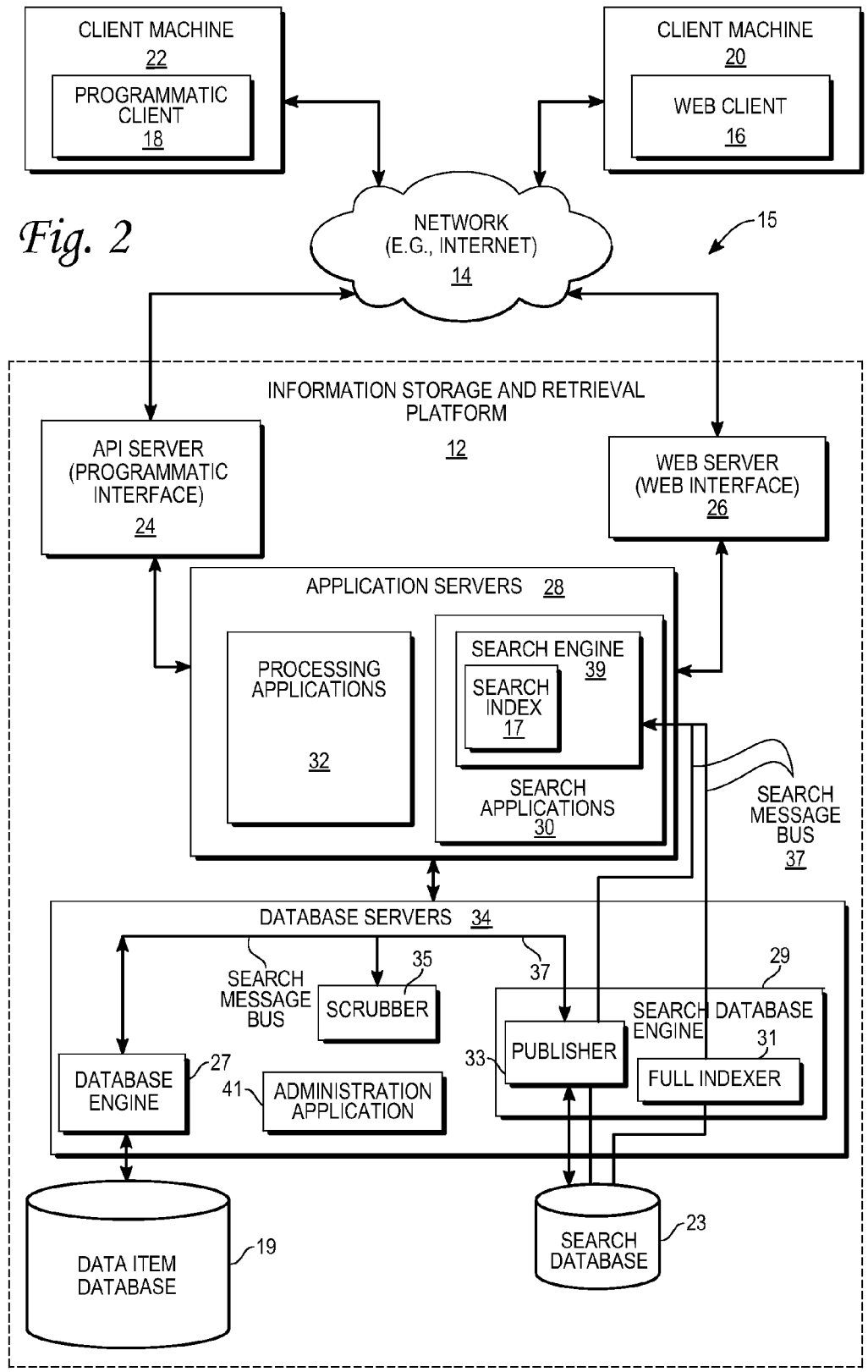
FIG. 2 is a system that includes a search system, according to one exemplary embodiment of the present invention.

FIG. 2 is a block diagram illustrating a search system 15 as embodied in the information storage and retrieval platform 12, according to an exemplary embodiment of the present invention. The search system 15 includes search system components located on or connected to the application servers 28 and the database servers 34.

A search request may take the form of a keyword request, an identification request or a browse request. A keyword request identifies data items that contain text with word(s) that match keyword(s) entered by a user. An identification request identifies a single data item that is identified by an identification number that is entered by the user. A browse request identifies data items according to various category, catalogue, or inventory data structures according to which data items may be classified within the information storage and retrieval platform 12. Associated with each of the above types of requests are filters that may be applied to the search result. A filter may be based on a numeric attribute value of a data item (e.g., price, quantity, size, etc.) or a text attribute value of a data item (e.g., color—red, green, blue; keywords, etc.).

The application servers 28 host a search engine 39 that includes a search index 17. The search engine 39 services search requests from users by returning search results that include one or more data items.

The database servers 34 support a database engine 27, a scrubber 35 and a search database engine 29. In addition, the database servers 34 provide connections to a search database 23 and a data item database 19.

The database engine 27 facilitates adding, updating, and deleting data items in the data item database 50. In addition, the database engine 27 may provide additional services including the storage and retrieval of currency exchange rates, category structures (e.g., listings are maintained in hierarchies of categories), zip code to regional identification maps and other information.

The scrubber 35 is used to normalize a data item. More specifically, the scrubber 35 may strip HTML tags from the description, convert text fields to Unicode, normalizes all date fields to a common date format, normalize all measurement units to a common measurement unit, and normalize all prices based on exchange rates to a common currency. For example, the scrubber 35 may convert the measurement unit of miles into kilometers. Another example may include converting Euros into US dollars. Similarly, the scrubber 35 may convert Greek letters, or the standard alphabet into a Unicode, such as UTF8. Normalization enables searching across a heterogeneous set of data items with a simplified search algorithm.

The search database engine 29 includes a publisher 33 and a full indexer 31. The publisher 33 is utilized for adding, deleting, and updating normalized listings both in the search database 23 and in the search index 17 in the search engine 39. The full indexer 31 generates and updates a complete search index 17 in the search engine 40 responsive to fragmentation of the search index 17 from the addition and deletion of listings or responsive to initializing of the search engine 39.

The components of the search system 15 may communicate with each other over a specialized message bus 37 that utilizes publish/subscribe middleware and database access software. In one embodiment the middleware may be embodied as TIBCO Rendezvous™, a middleware or Enterprise Application Integration (EAI) product developed by Tibco Software, Inc. Palo Alto, Calif.

The search system 15 optimally and efficiently responds to a search request by maintaining a normalized memory resident copy of all data items in the information storage and retrieval platform 12 in the search index 17. Thus, the search engine 39 may respond to a search request by accessing the memory resident search index 17 to obtain the requested data items without the performance penalty that comes from the processing overhead and delay associated with a database access. One example of the data flow necessary to maintain accurate data item information is described. In response to a user adding a data item, the database engine 27 updates the data item database 19 thereby triggering a publishing of the newly added data item to the scrubber 35. The scrubber 35 normalizes the data item by retrieving additional information from the data item database 19 including currency exchange rates, category structures, zip code to regional identification maps, etc. . . . . . The scrubber 35 stores the normalized data item in the search database 23 via the publisher 33, thereby triggering the publisher 33 to publish the normalized data item to the search index 17 in the search engine 39. A similar data flow will result from an update or deletion of a data item. It will be appreciated that the above described dataflow may also be invoked for every data item in the data item database 19 responsive to a currency exchange rate change, a category structure change, a zip code to regional mapping change, or any other modification which may require a reevaluation of the listing by the scrubber 35.

The other pathway between the search database 23 and the search engine 39 is via the full indexer 31. As described above, this path is utilized for a batch update of the search engine 39. The full indexer 17 retrieves data items from the search database 23, builds a new search index 17, and publishes the entire search index 17 to the search engine 39.

FIG. 3 is a block diagram illustrating an architecture of the search engine 39, according to an exemplary embodiment. The search engine 39 includes search tables 131, a search index 17, an identifying module 138, an analyzing module 140, a determining module 142 and a communication module 144.

The identifying module 130 receives a search request from a user and identifies data items. The analyzing module 140 builds hash tables, extracts attribute values from the data items and identifies a distribution of data items based on the extracted attribute values.

The determining module 142 examines previously constructed hash tables and determines if the identified distribution of data items in the hash table may facilitate (or aid) a user search of the information resource.

The communication module 144 communicates one or more distributions of data items to the user in the form of a histogram, a pie chart, or frequency values, for example. In other embodiments, the communication module 144 may utilize the identified distributions to select one or more attribute selectors for communication to the user.

Figure 4:
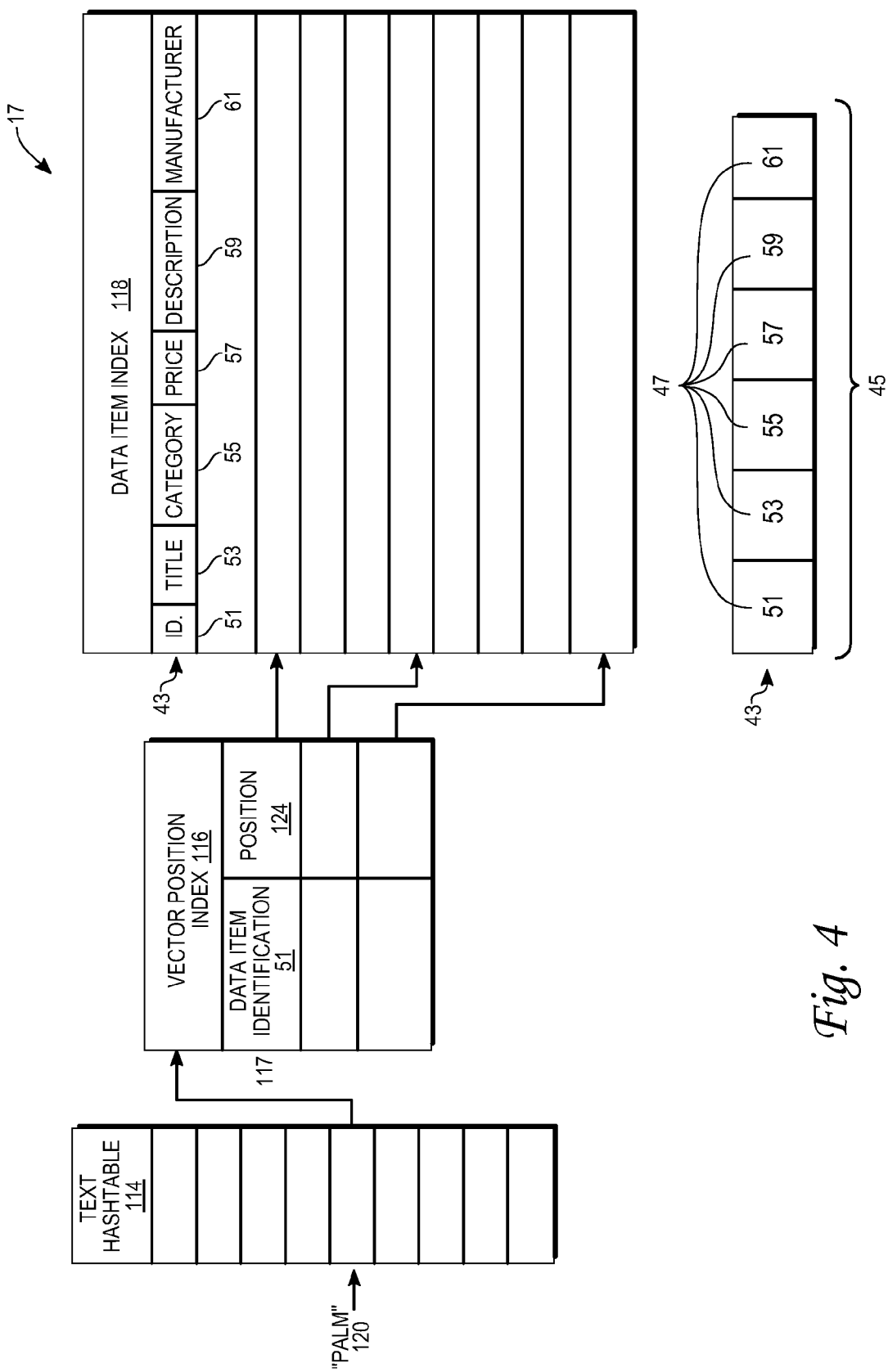
FIG. 4 is a block diagram illustrating a search index, according to an exemplary embodiment of the present invention.

FIG. 4 is a block diagram illustrating a search index 17, according to an exemplary embodiment. The search index 17 includes a data item index 118, a vector position index 116 and a text hash table 114.

The data item index 118 includes all data items 43 in the storage and information retrieval platform 12. Each data item 43 includes a set of attributes 45, which are named fields that enable access to corresponding attribute values 47. In one embodiment, the data item 43 includes a data item identification attribute 51, a title attribute 53, a category attribute 55, a price attribute 57, a description attribute 59 and a manufacturer attribute 61. Other embodiments may include different and/or additional attributes 45.

The text hash table 114 is indexed by a numeric value generated by an algorithm that accepts a word of text as input (e.g., "Palm"). Each entry in the text hash table 114 points to a vector position index 116. The vector position index 116 links a word in the text hash table 114 (e.g., "Palm") to a corresponding set of vector positions 117. Each vector position 117 includes a data item identification 51 and a position 124. The data item identification 51 identifies a data item 43 in the data item index 118. The position 124 identifies the word position in the attribute value 47 for the title attribute 53 (e.g., "Palm"). Other embodiments may enable searching of other text attributes 45 (e.g., description attribute 59) or combinations thereof.

Figure 5:
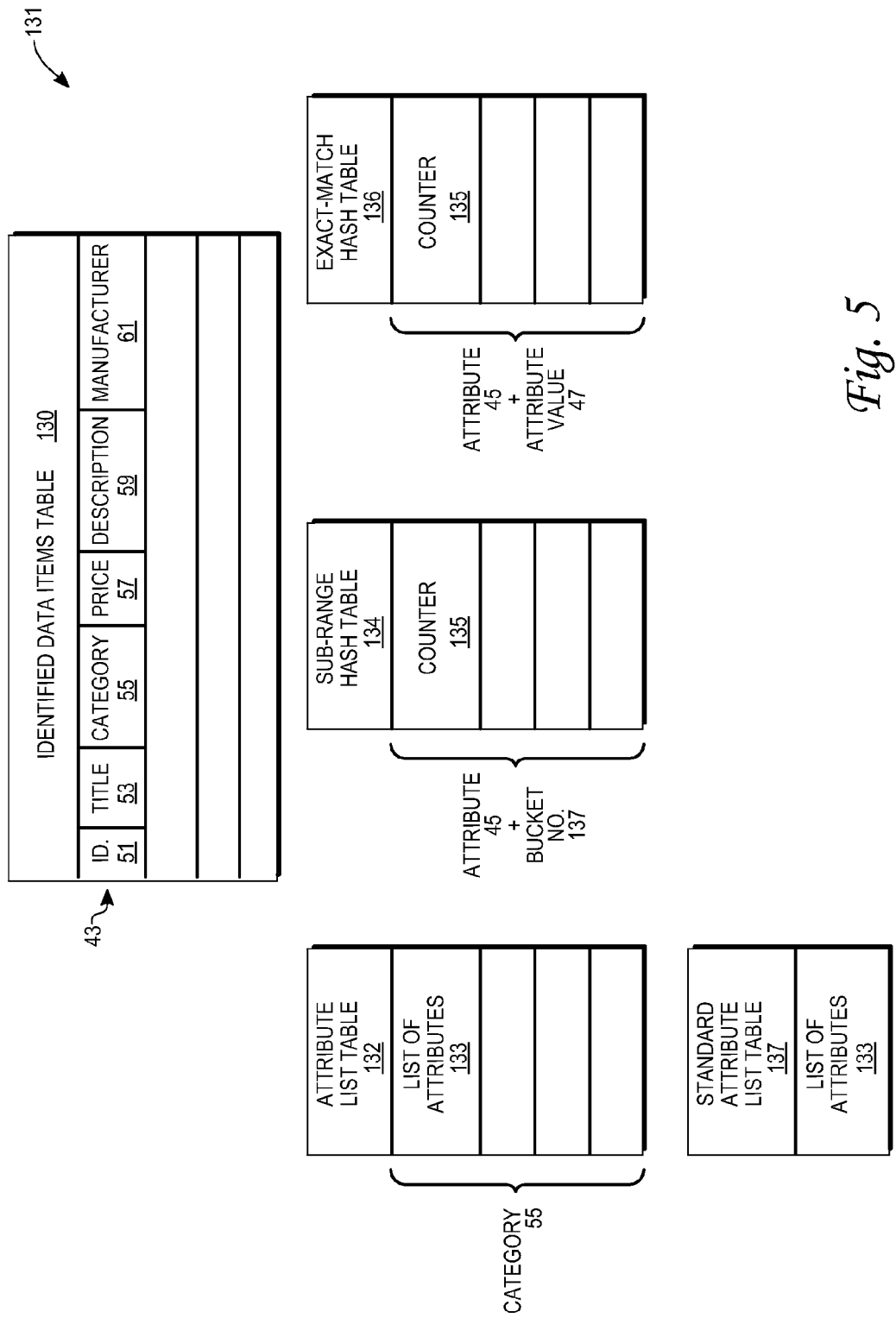
FIG. 5 is a block diagram illustrating tables utilized by the search engine, according to an exemplary embodiment of the present invention.

FIG. 5 is a block diagram illustrating search tables 131, according to an exemplary embodiment, that are utilized by the search engine 39. The search tables 131 include an identified data items table 130, an attribute lists table 132, a standard attributes list table 137, a sub-range hash table 134, and an exact-match hash table 136. The tables illustrated are generated responsive to a search request from a user. One or more hash tables may be generated.

The identified data items table 130 includes all data items 43 responsive to a user's search request (e.g., a keyword request, an identification request or a browse request) after filtering has been performed.

The attribute lists table 132 includes multiple lists of attributes 133. Each list of attributes 133 includes attributes 45. In one embodiment, the attribute list table 132 is indexed by a category to access a list of attributes 133 that identifies data attributes for data items that are classified within the corresponding category. It will be appreciated that other embodiments may utilize structures other than categories to classify data items.

The standard attribute list table 137 includes an attribute list table 133 that identifies attributes 45 that are common to all data items.

The sub-range hash tables 134 and the exact-match hash tables 136 are temporary data structures that are generated and utilized by the search engine 39 to record a distribution of data items in a search result based on an attribute value in a data item (e.g., price, manufacturer, color, etc.). The search engine 39 generates a hash table for each attribute specified in the attribute list table 132 or for each item specified in a standard attribute list table 133.

The sub-range hash table 134 is utilized to count the frequency of data items based on a numeric attribute value 47 (e.g., a number). The sub-range hash table 134 is indexed by a hash value that is generated by concatenating attribute 45 and bucket ID text strings. For example, the attribute 45 may be a text string such as "title", "category", "price", etc and the bucket may be a text string that corresponds to a numeric range of values associated with the attribute 45.

The exact-match hash table 136 is utilized to count the frequency of data items based on an attribute value 47 that contains text. The exact-match hash table 136 is indexed by a hash value that is generated from an attribute 45 text string and corresponding attribute values 47 text string. For example, an exact-match hash table 136 may be generated for the attribute manufacturer 61 by concatenating the string "manufacturer" with every possible attribute value (e.g., "Sony", "Palm", "Apple", etc.).

Figure 6:
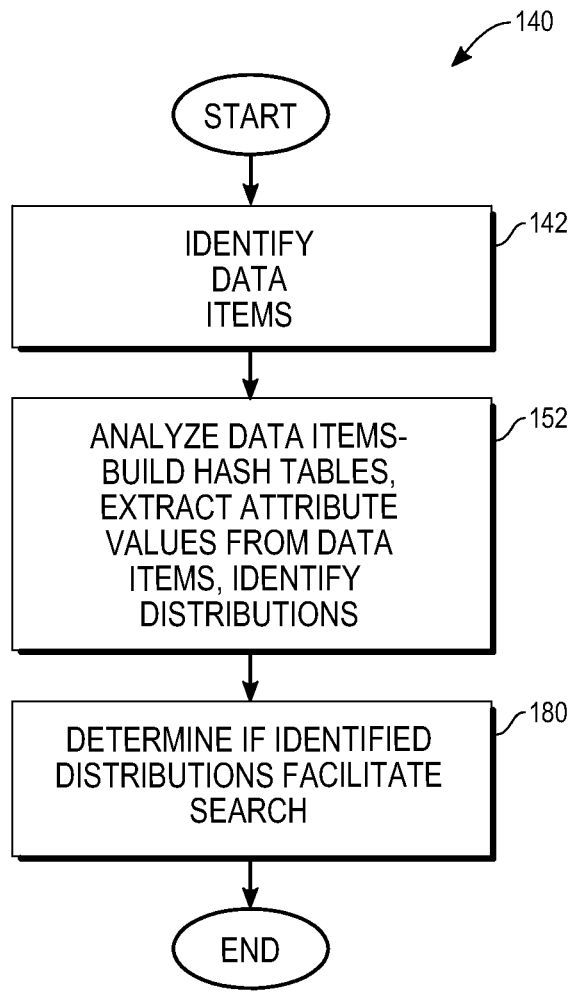
FIG. 6 is a flow chart illustrating a method, according to an exemplary embodiment of the present invention, to facilitate a search of an information resource.

FIG. 6 is a flowchart illustrating a method 140, according to an exemplary embodiment, to facilitate a search of an information resource. At box 142, the identifying module 138 identifies data items 43 responsive to a search request from a user.

Figure 10:
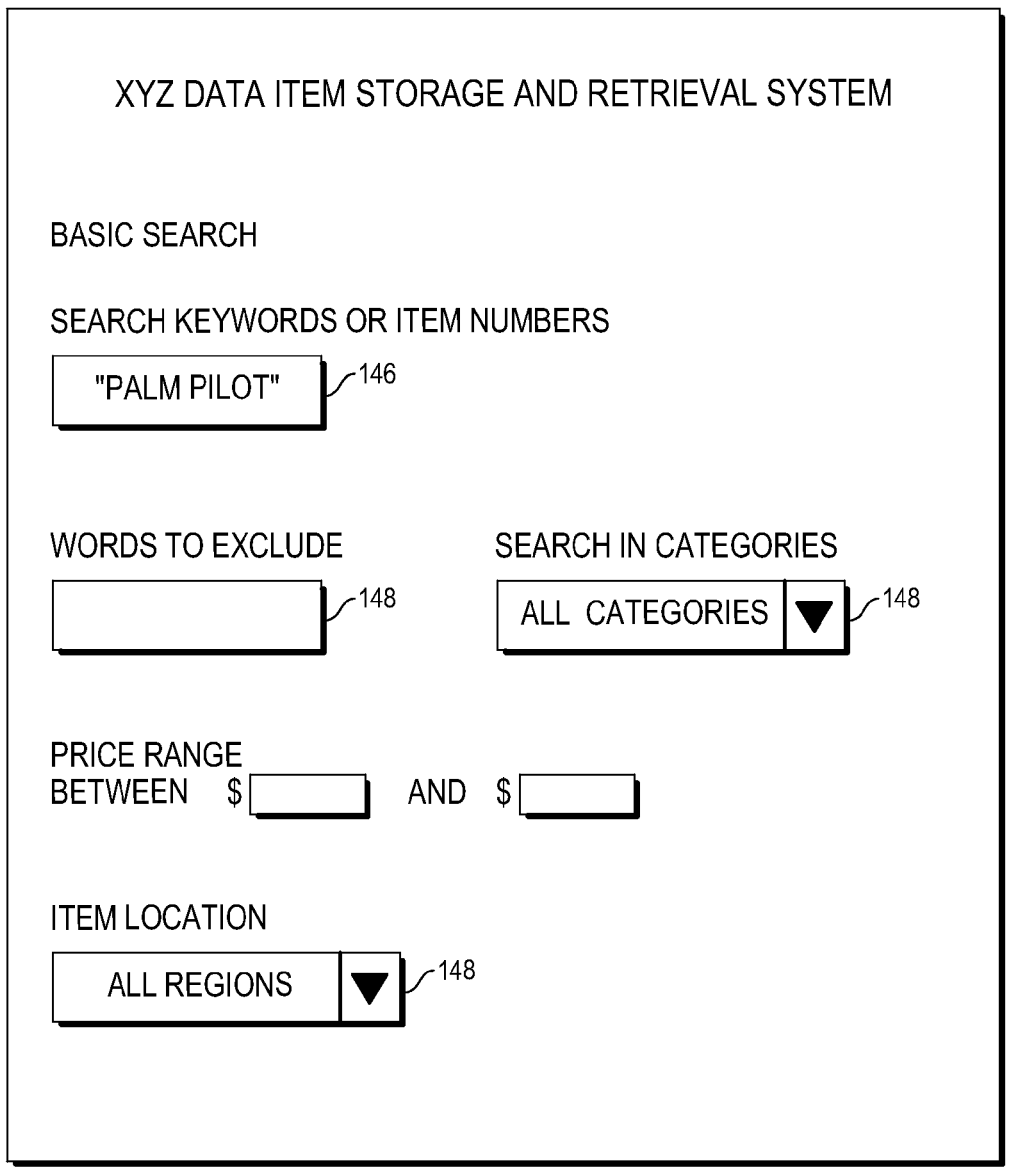
FIGS. 10-13 illustrate user interface screens, according to an exemplary embodiment of the present invention.

FIG. 10 illustrates a user interface 144, according to an exemplary embodiment, to generate a keyword search request or an identification search request. The user interface 144 includes a number of screen elements that allow the user to identify and filter data items 43. A text entry box 146 enables a user to specify a keyword or item number that will be utilized by the identification module 142 to identify all data items 43 that include the keywords or match the item number. A number of filters 148 are illustrated and may be utilized by the user to cause the identifying module 142 to remove data items 43 from a generated search result. For example, a user may filter data items 43 that contain specified words and/or data items that are classified in a category other than a specified category and/or data items that contain a price outside a specified range and/or data items that ship from a location other than a location specified.

Figure 11:
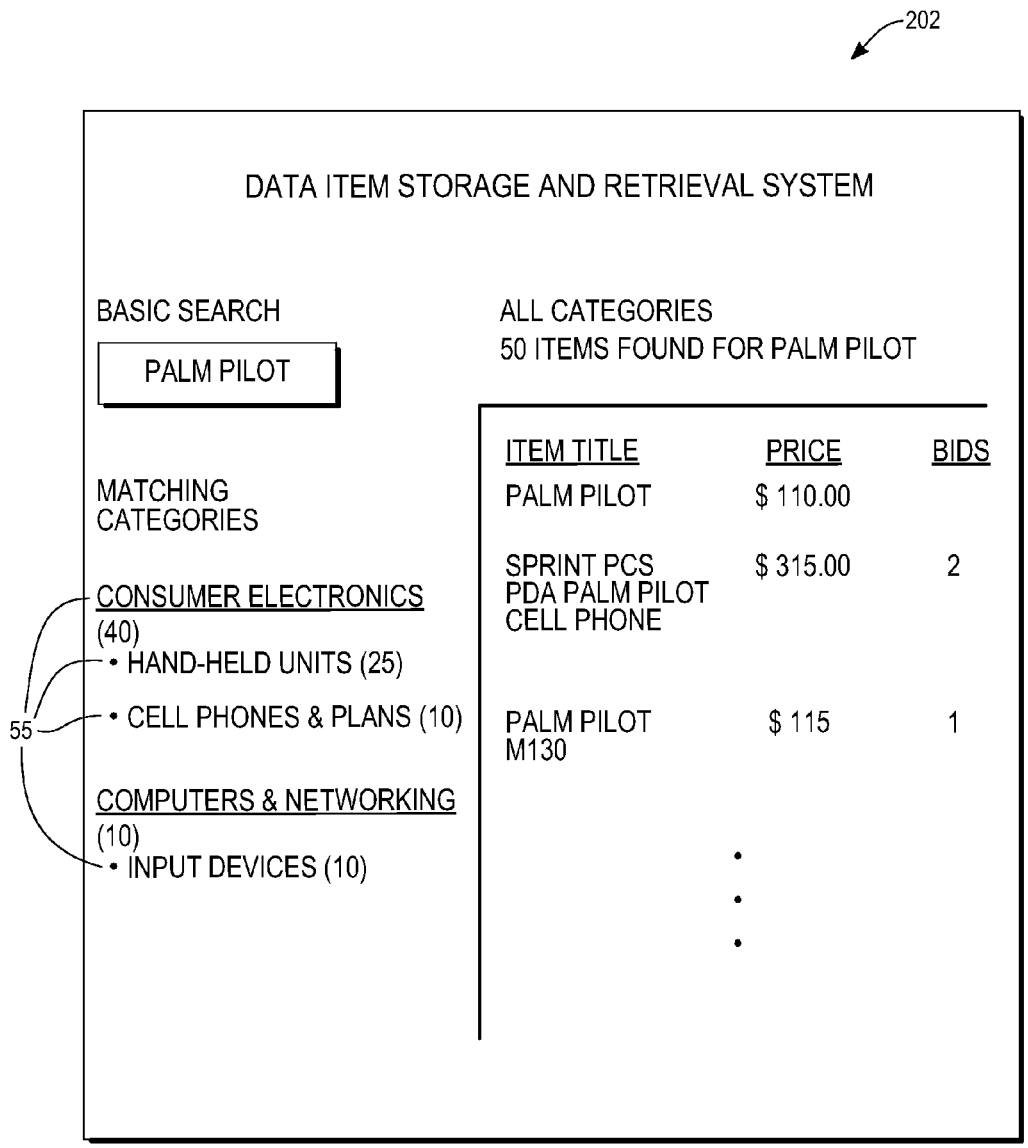

In the present example, the user enters the words "Palm Pilot" to initiate a keyword search. The identifying module 138 responds by identifying the appropriate data items 43 and the information storage and retrieval platform 12 displays a user interface 150, as illustrated in FIG. 11, according to an exemplary embodiment of the present invention.

The user interface 150 displays all the data items 43 that contain the words "Palm" and/or "Pilot". The user interface 150 includes a number of categories 55 that may be selected by the user to further identify data items within the category 55. In the present example, the user selects the category 55 "Handheld Units".

Returning to FIG. 6, at box 142, the identifying module 138 filters the data items 43 that contain the words "Palm" and/or "Pilot" by removing all data items that are not in the category "Handheld Units".

Figure 7:
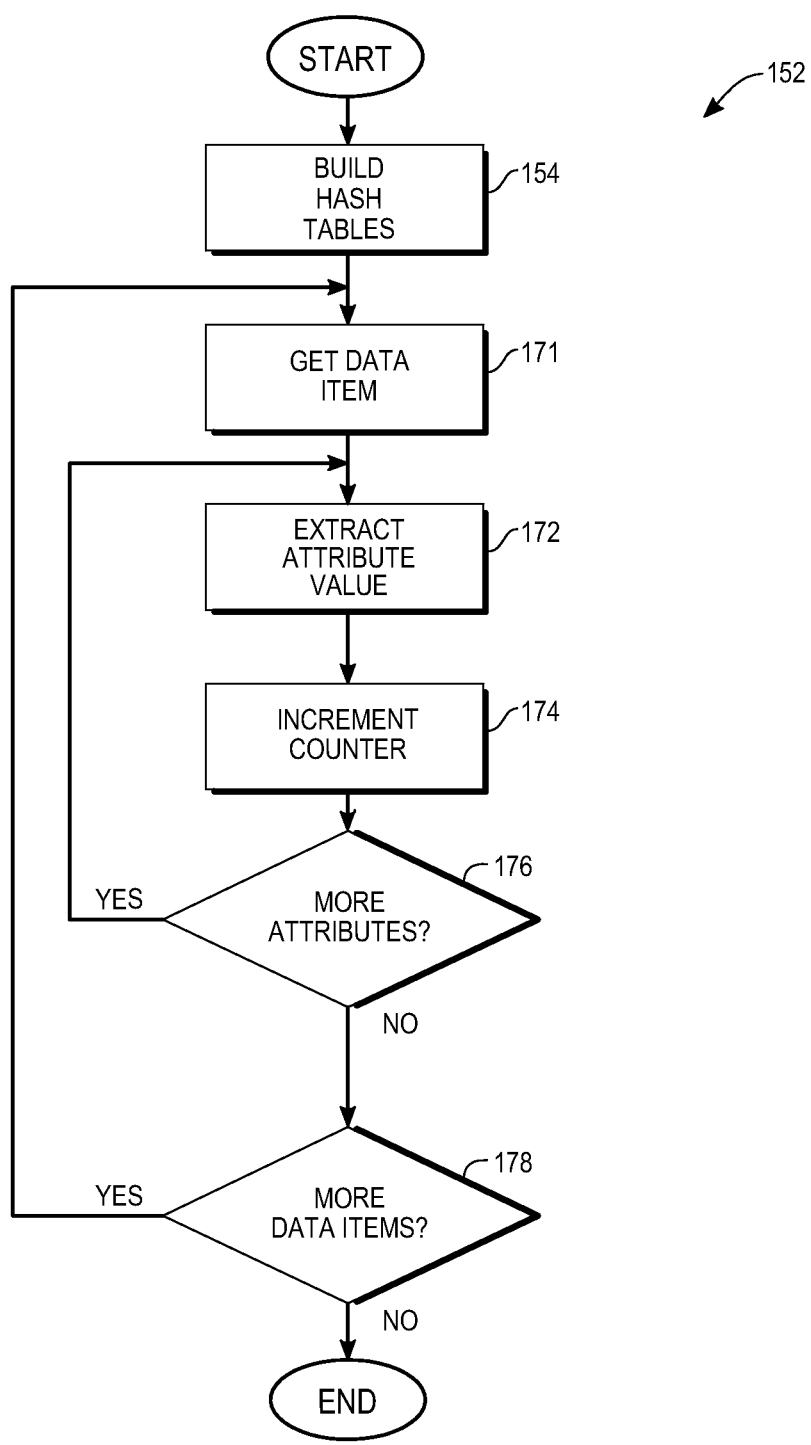
FIG. 7 is a flow chart illustrating a method, according to an exemplary embodiment of the present invention, for analyzing data items.

At box 152, the analyzing module 140 analyzes data items 43 by building hash tables, extracting values from data items 43 and identifying distributions of data items for one or more attributes common to the data items, as illustrated on FIG. 7, according to an exemplary embodiment of the present invention.

Figure 8:
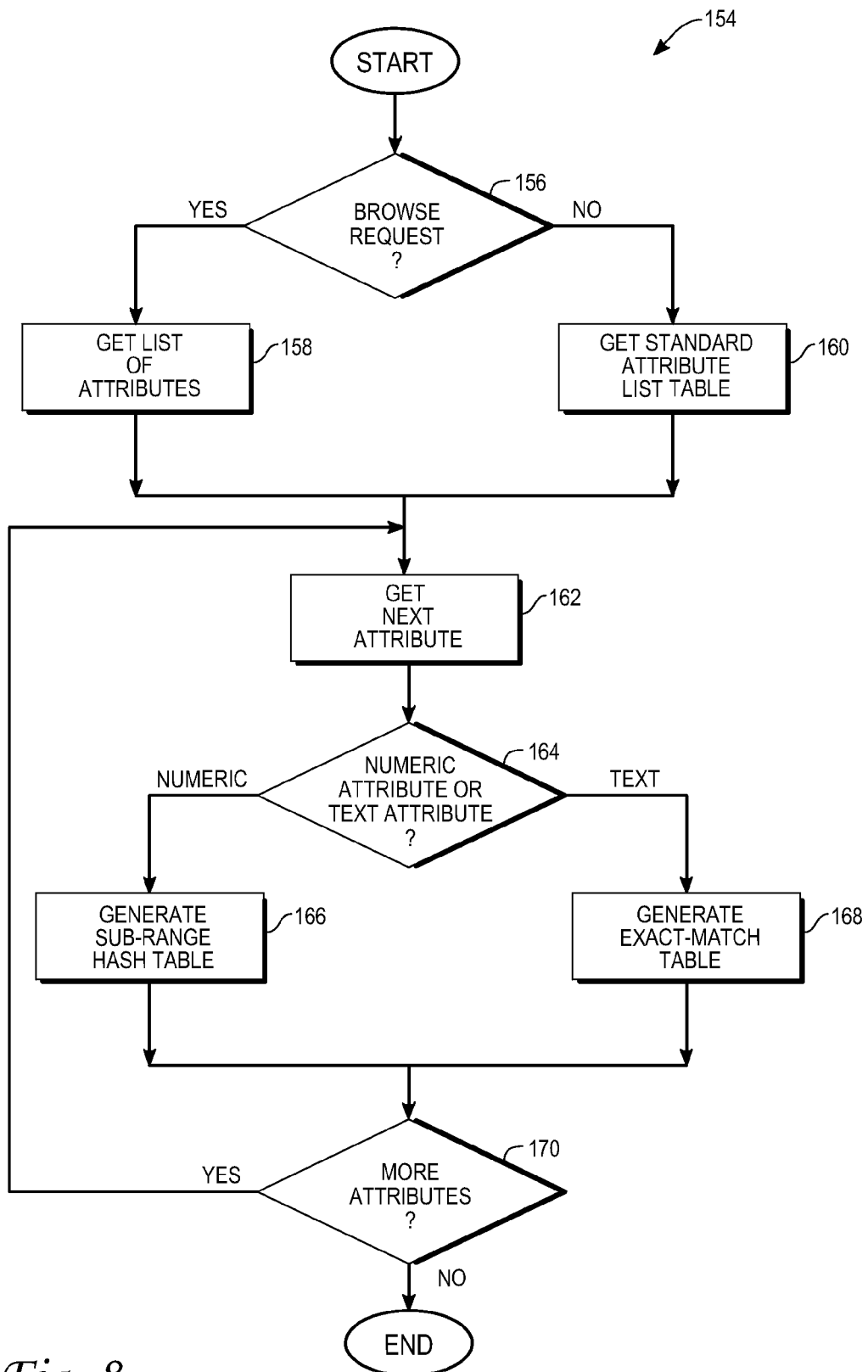
FIG. 8 is a flow chart illustrating a method, according to an exemplary embodiment of the present invention, for building hash tables.

In FIG. 7, at box 154 the analyzing module 140 builds hash tables corresponding to the search results as illustrated on FIG. 8, according to an exemplary embodiment.

In FIG. 8, at decision box 156, the analyzing module 140 determines if the search results are responsive to a browse request. If the search results are responsive to a browse request, then a branch is made to box 158. Otherwise a branch is made to box 160.

At box 158, the analyzing module 140 indexes into the attribute list table 132 based on the category "Handheld Units", as specified by the user, and extracts the corresponding list of attributes 133. Otherwise, at box 160, the analyzing module 140 gets a list of attributes 133 from the standard attribute list table 137.

At box 162, the analyzing module 140 gets the next attribute in the list of attributes 133.

At decision box 164, the analyzing module 140 determines if the current attribute in the list of attributes 133 is a numeric attribute or text attribute. If the current attribute in the list of attributes 133 is a numeric attribute, then a branch is made to box 166. Otherwise a branch is made to box 168.

At box 166, the analyzing module 140 generates a sub-range hash table 134 for the numeric attribute 45. Otherwise, at box 168, the analyzing module 140 generates an exact-match hash table 48 for the text attribute 45.

At decision box 170, the analyzing module 140 determines if there are more attributes 45 in list of attributes 133. If there are more attributes 45 in the attribute list 133 then the analyzing module 140 branches to box 162. Otherwise processing ends.

Returning to FIG. 7, at box 171, the analyzing module 140 gets the next data item 43.

At box 172, the analyzing module 140 extracts an attribute value 47 from the data item 43.

At box 174, the analyzing module 140 generates a hash value by concatenating the attribute name 45 and the attribute value 47 or the associated bucket ID. Next, the analyzing module 140 utilizes the hash value to accesses the appropriate entry in the exact-match hash table 136 or the sub-range hash table 134 and increments the counter 135.

At decision box 176, the analyzing module 140 determines if there are more attributes in the data item 43. If there are more attributes in the data item 43 then a branch is made to box 172. Otherwise processing continues at decision box 178.

At decision box 178, the analyzing module 140 determines if there are more data items 43 in the identified data items table 130. If there are more data items, then the analyzing module 140 branches to box 171. Otherwise, processing ends.

Figure 9:
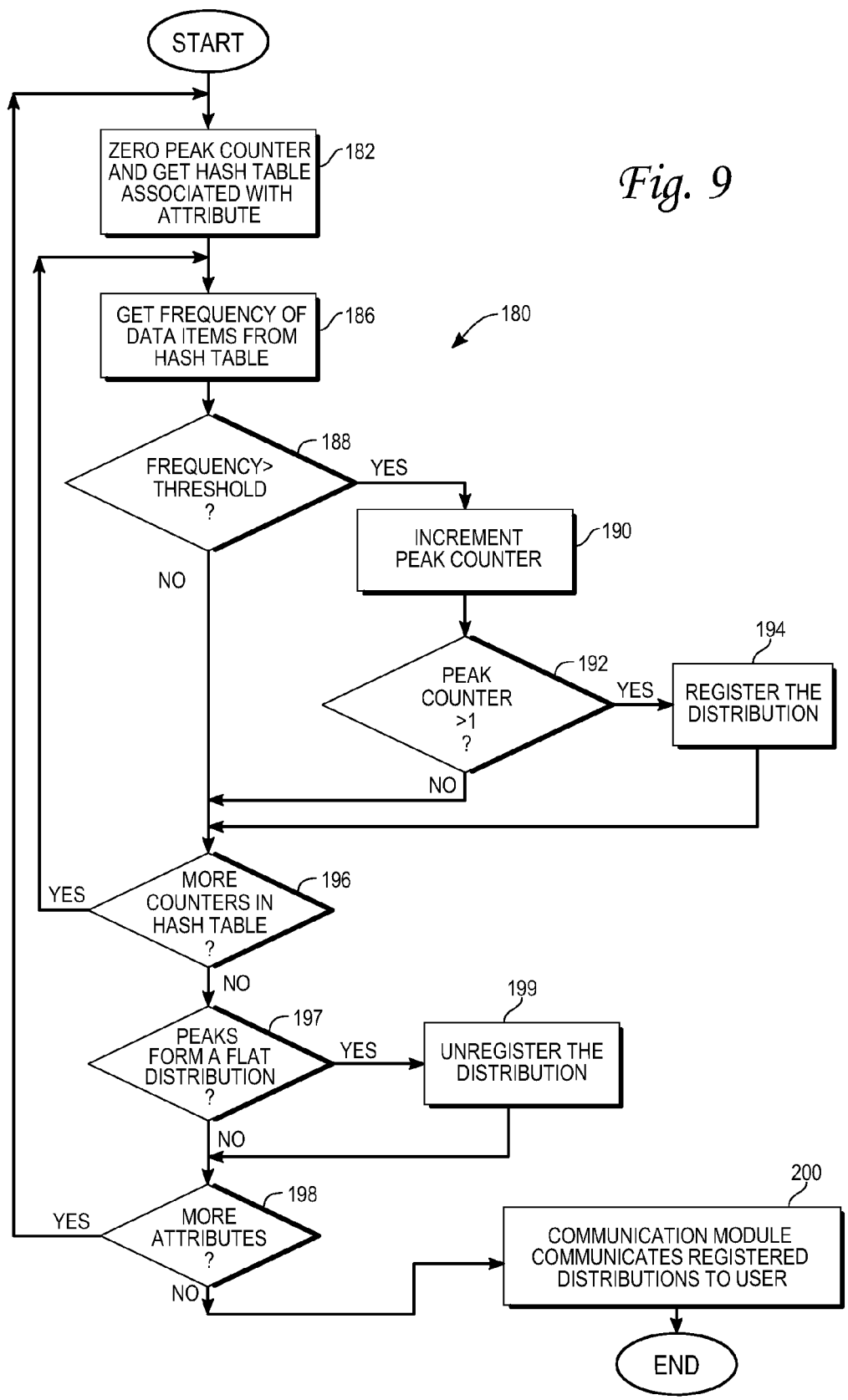
FIG. 9 is a flow chart illustrating a method, according to an exemplary embodiment of the present invention, for determining if the identified distribution facilitates a search and communicating the identified distribution.

Returning to FIG. 6, at box 180, the determining module 142 determines if the distributions of data items as described by the hash tables facilitate additional searching by the user. FIG. 9 illustrates the box 180, according to an exemplary embodiment.

At box 182, the determining module 142 zeroes a peak or modal counter and gets a hash table that is associated with an attribute.

At box 186, the determining module 142 extracts the frequency of data items from a counter 135 in the hash table.

At decision box 188, the determining module 142 determines if the counter 135 exceeds a predetermined threshold. If the counter 135 exceeds a predetermined threshold, then a branch is made to box 190. Otherwise, processing continues at decision box 196.

At box 190, the determining module 142 increments the peak counter.

At decision box 192, the determining module 142 determines if the peak counter is greater than 1. If the peak counter is greater than 1, then the determining module 142 branches to box 194. Otherwise, processing continues at decision box 196.

At box 194, the determining module 142 registers the distribution of data items 43 for communication to the user.

At decision box 196, the determining module 142 determines if there are more counters 135 in the hash table. If there are more counters 135 in the hash table, then the determining module 142 branches to box 186. Otherwise, processing continues at decision box 197.

At decision box 197, the determining module 142 determines if the peaks in the hash table form a flat distribution. If the peaks form a flat distribution then a branch is made to box 199. Otherwise a branch is made to decision box 198.

At box 199, the determining module 142 unregisters the distribution for communication to the user and processing continues at decision box 198.

At decision box 198, the determining module 142 determines if there are more hash tables. If there are more hash tables, then processing continues at box 182. Otherwise, processing continues at box 200. It will be appreciated that some embodiments may include multiple hash tables for the same attribute. For example, a first hash table associated with a first range of attribute values may include the sub-range of attribute values of $1.00-$6.99, $7.00-$12.99 and $13.00-$18.99 and a second hash table associated with a second range of attribute values may include the sub-range attribute values of $7.00-$8.99, $9.00-$10.99 and $11.00-$12.99. If, for example, a single mode or peak distribution was identified with the first range of attribute values then the second range of attribute values may be utilized instead of the first range of attribute values to identify a distribution that facilitates searching the information resource.

Figure 12:
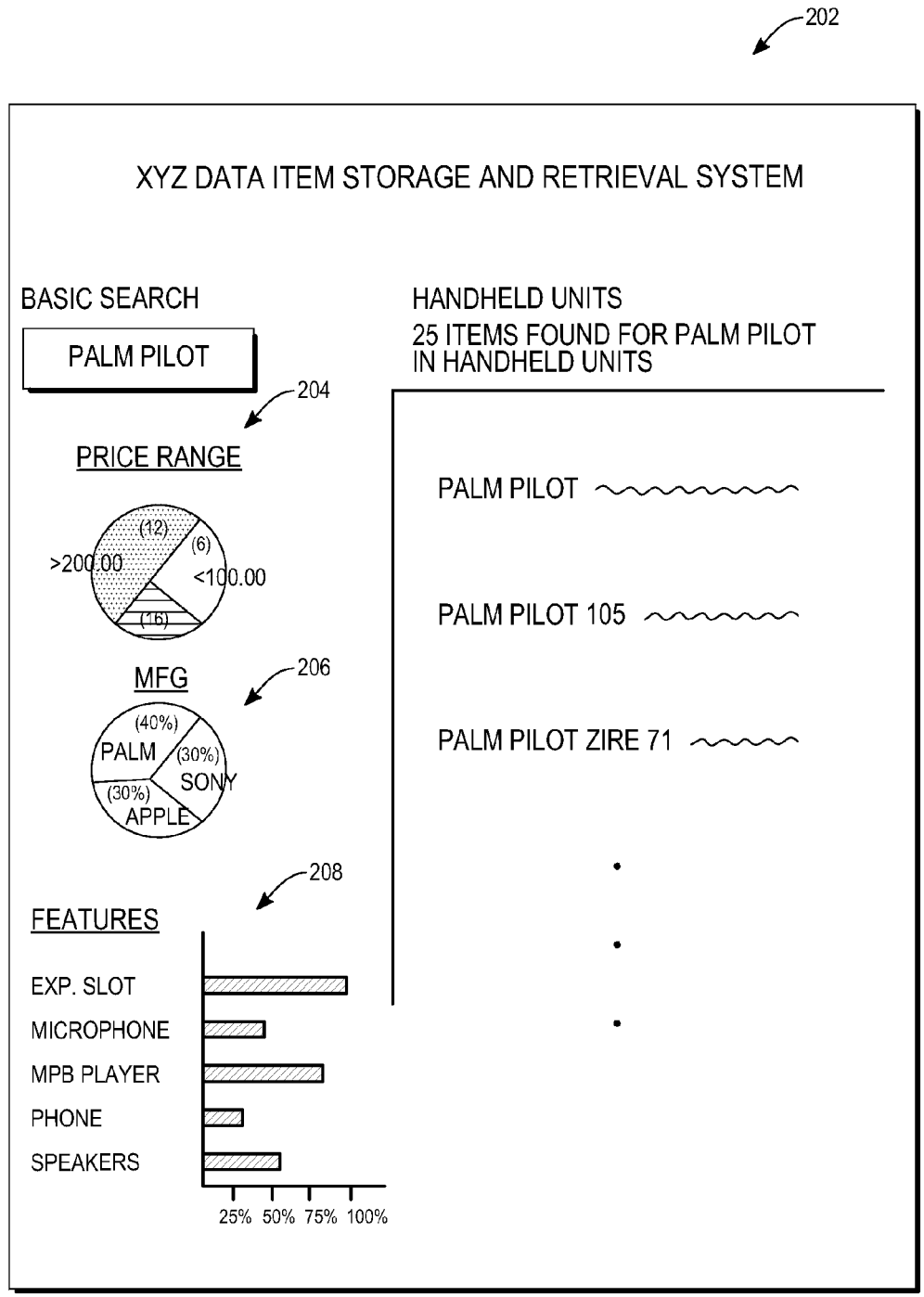

At box 200, the communication module 144 communicates a user interface to the user that includes distributions of data items that were identified to facilitate searching the information resource. FIG. 12 illustrates a user interface 202, according to an exemplary embodiment. User interface 202 includes an pie chart 204 for a price attribute 57, a manufacturing pie chart 206 for a manufacturing attribute 61 and a histogram 208 a feature attribute. The pie charts and histogram illustrate distributions for all data items in the "Handheld Units" category that contain the words "Palm" and/or "Pilot" that were identified to facilitate a search the information resource. For example, the user may glean distributions for price range, manufacturer and Palm Pilot features. Note that the pie chart 204 communicates an absolute count of Palm Pilots corresponding to each segment of the pie chat 204 and that the pie chart 206 communicates a percentage of Palm Pilots corresponding to each segment of the pie chart 206. It will be appreciated that a user could select, via a mouse or keyboard keystrokes, components of the histogram 208 or pie charts 204 or 206 to further filter the search results.

Note that attributes 45 with distributions that do not facilitate the search of the information resource are not displayed. For example, an attribute may not be displayed if the associated distribution exhibits a single peak, exhibits one or no peaks, exhibits a flat distribution, etc.

Figure 13:
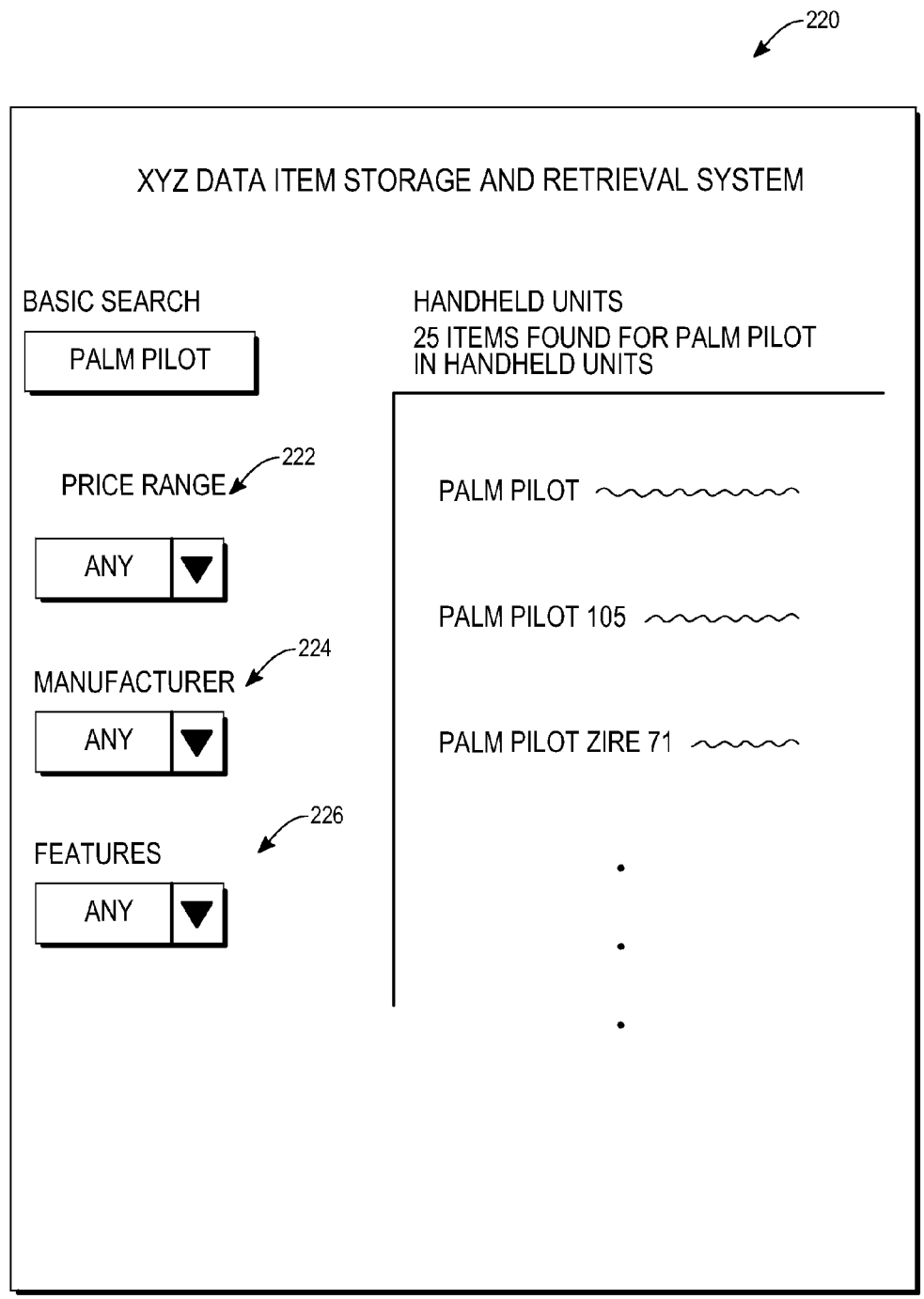

In another embodiment, the communication module 144 may communicate a user interface that includes only selected attribute value selectors for attributes with identified distributions of data items 43 that facilitate searching the information resource. FIG. 13 illustrates a user interface 220, according to an exemplary embodiment, including attribute value selectors. The user interface 220 includes a price range attribute value selector 222, a manufacturer attribute value selector 224, and a feature attribute value selector 226. The user interface 220 does not include attribute value selectors for attributes with distributions that do not facilitate the search of the information resource; but rather, only meaningful attribute value selectors are presented. The user interface 220 facilitates the search of the information resource by enabling the user to further filter the search results by selecting on or more attribute values with the attribute value selectors 222, 224 or 226.

Network Based Trading Platform Embodiment

The above-described invention may be embodied in any system that requires the storage and retrieval of data items. For example, the invention may be embodied in a network-based trading platform 230 as described below.

Figure 14:
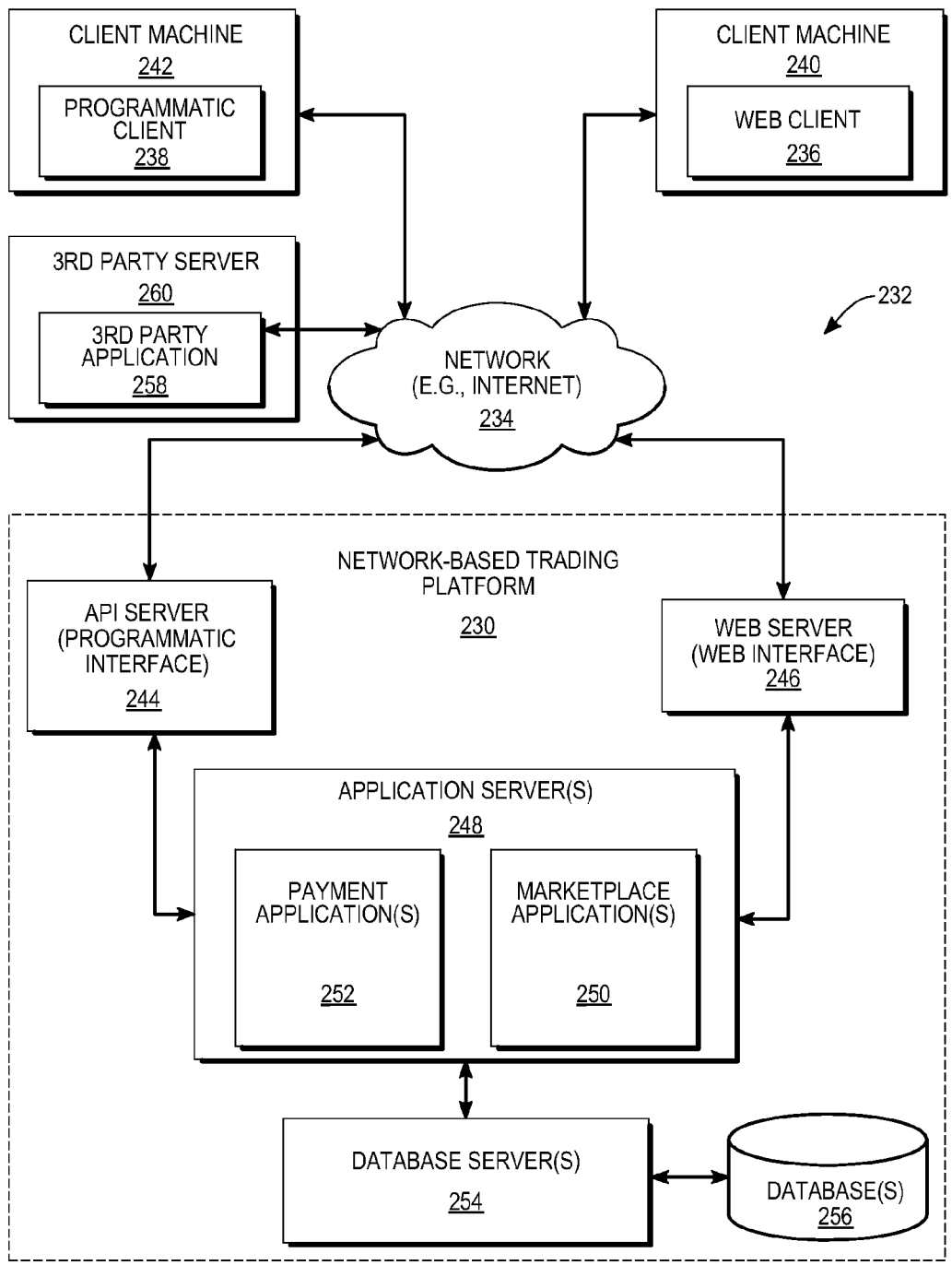
FIG. 14 is a block diagram illustrating a trading system, according to an exemplary embodiment of the present invention.

FIG. 14 is a network diagram depicting a system 232, according to one exemplary embodiment of the present invention, having a client-server architecture. A commerce platform, in the exemplary form of a network-based trading platform 230, provides server-side functionality, via a network 234 (e.g., the Internet) to one or more clients. FIG. 14 illustrates, for example, a web client 236 (e.g., a browser, such as the INTERNET EXPLORER browser developed by Microsoft Corporation of Redmond, Wash. State), and a programmatic client 238 executing on respective client machines 240 and 242.

Turning specifically to the network-based trading platform 230, an Application Program Interface (API) server 244 and a web server 246 are coupled to, and provide programmatic and web interfaces respectively to, one or more application servers 248. The application servers 248 host one or more marketplace applications 250 and payment applications 252. The application servers 248 are, in turn, shown to be coupled to one or more databases servers 254 that facilitate access to one or more databases 256.

The marketplace applications 250 provide a number of marketplace functions and services to users that access the network-based trading platform 230. The payment applications 252 likewise provide a number of payment services and functions to users. The payment applications 256 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 250. While the marketplace applications 250 and payment applications 252 are shown in FIG. 14 to both form part of the network-based trading platform 230, it will be appreciated that, in other embodiments, the payment applications 252 may form part of a payment service that is separate and distinct from the network-based trading platform 230.

Further, while the system 232 shown in FIG. 14 employs a client-server architecture, the present invention is of course not limited to such an architecture, and could equally well find application in a distributed, or peer-to-peer, architecture system. The various marketplace and payment applications 250 and 252 could also be implemented as standalone software programs, which do not necessarily have networking capabilities.

The web client 236, it will be appreciated, accesses the various marketplace and payment applications 250 and 252 via the web interface supported by the web server 246. Similarly, the programmatic client 238 accesses the various services and functions provided by the marketplace and payment applications 250 and 252 via the programmatic interface provided by the API server 244. The programmatic client 238 may, for example, be a seller application (e.g., the TURBOLISTER application developed by eBay Inc., of San Jose, Calif.) to enable sellers to author and manage listings on the network-based trading platform 230 in an off-line manner, and to perform batch-mode communications between the programmatic client 238 and the network-based trading platform 230.

FIG. 14 also illustrates a third party application 258, executing on a third party server machine 260, as having programmatic access to the network-based trading platform 230 via the programmatic interface provided by the API server 244. For example, the third party application 258 may, utilizing information retrieved from the network-based trading platform 230, support one or more features or functions on a website hosted by the third party. The third party website may, for example, provide one or more promotional, marketplace or payment functions that are supported by the relevant applications of the network-based trading platform 230.

Marketplace and Payment Applications

Figure 15:
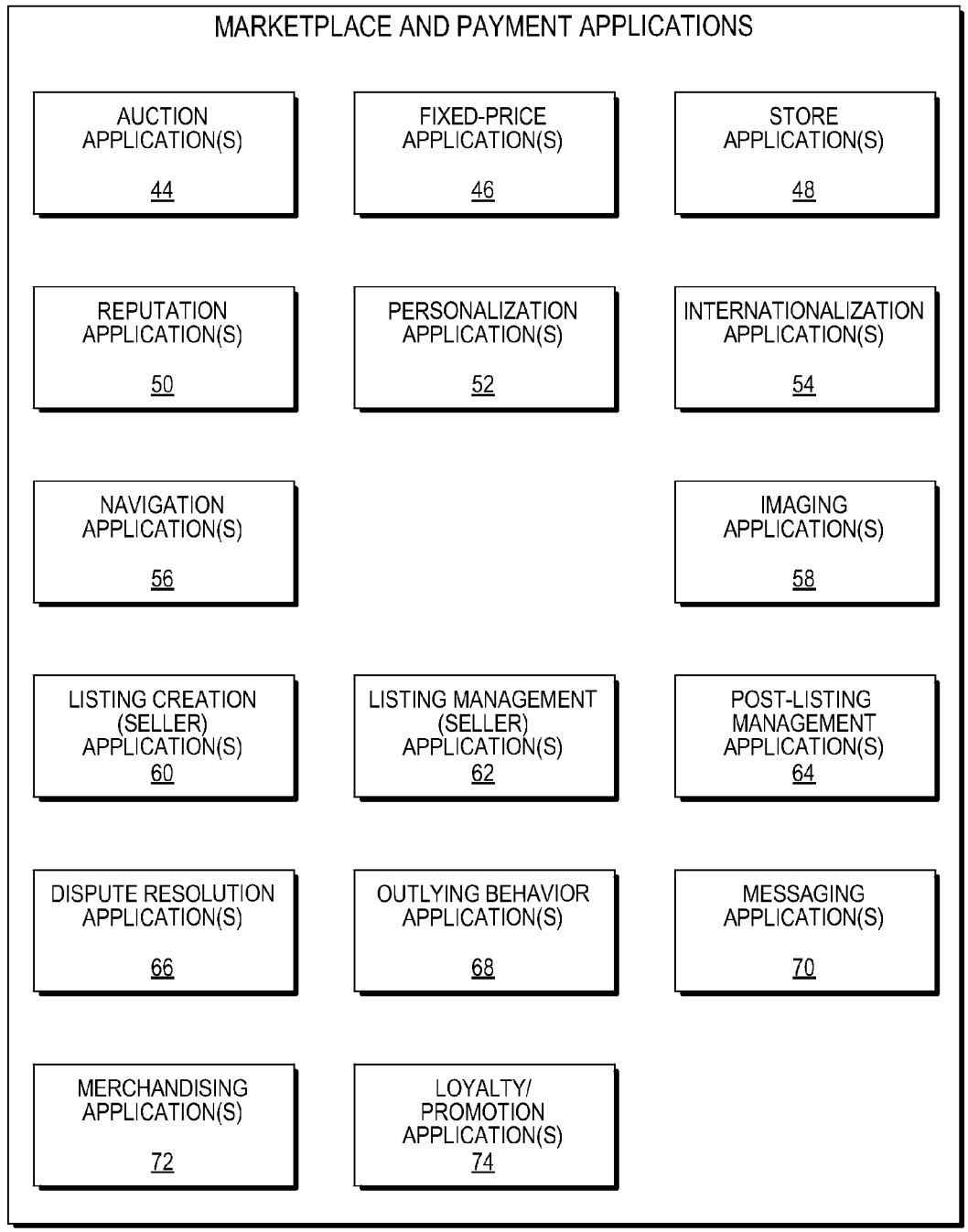
FIG. 15 is a block diagram illustrating multiple marketplace and payment applications that, in one exemplary embodiment of the present invention, are provided as part of the network-based trading platform.

FIG. 15 is a block diagram illustrating multiple marketplace applications 250 and payment applications 252 that, in one exemplary embodiment, are provided as part of the network-based trading platform 230. The network-based trading platform 230 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 250 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based trading platform 230 to establish, build and maintain reputations, which may be made available and published to potential trading partners. Consider that where, for example, the network-based trading platform 230 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based trading platform 230 over time. Other potential trading partners may then reference such a reputation for the purposes of assessing credibility and trustworthiness.

Personalization applications 52 allow users of the network-based trading platform 230 to personalize various aspects of their interactions with the network-based trading platform 230. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the network-based trading platform 230 and other parties.

In one embodiment, the network-based trading platform 230 may support a number of marketplaces that are customized, for example, for specific geographic regions. A version of the network-based trading platform 230 may be customized for the United Kingdom, whereas another version of the network-based trading platform 230 may be customized for the United States. Each of these versions may operate as an independent marketplace, or may be customized (or internationalized) presentations of a common underlying marketplace. The latter version may characterize a user's access to the network-based trading platform 230 as originating from a particular country by identifying the country specific presentation that is selected by the user.

Navigation of the network-based trading platform 230 may be facilitated by one or more navigation applications 56. For example, a search application allows a user to execute key word searches of data items 43 or listings published via the network-based trading platform 230. A browse application allows users to browse various category, catalogue, or inventory data structures according to which data items 43 or listings may be classified within the network-based trading platform 230. Indeed, the navigation applications 56 may include an identifying module 138, an analyzing module 140, a determining module 142 and a communication module 144, as described above, and any other software and/or hardware components necessary to embody the present invention. Other navigation applications may also be provided including a rules engine that applies a characteristic rule to a listing to facilitate filtering the listing, a scrubber for normalizing listings, and a search database engine for maintaining a search index and a search engine that facilitates the search and browse applications.

In order to make listings, available via the network-based trading platform 230, as visually informing and attractive as possible, the marketplace applications 250 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers to conveniently author listings pertaining to goods or services that they wish to transact via the network-based trading platform 230, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a buyer may wish to leave feedback regarding a particular seller. To this end, a post-listing management application 64 may provide an interface to one or more reputation applications 50, so as to allow the buyer to conveniently to provide feedback regarding a seller to the reputation applications 50. Feedback may take the form of a review that is registered as a positive comment, a neutral comment or a negative comment. Further, points may be associated with each form of comment (e.g., +1 point for each positive comment, 0 for each neutral comment, and −1 for each negative comment) and summed to generate a rating for the seller.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

Messaging applications 70 are responsible for the generation and delivery of messages to users of the network-based trading platform 230, such messages for example advising users regarding the status of listings at the network-based trading platform 230 (e.g., providing "outbid" notices to bidders during an auction process or to provide promotional and merchandising information to users).

Merchandising applications 72 support various merchandising functions that are made available to sellers to enable sellers to increase sales via the network-based trading platform 230. The merchandising applications 80 also operate the various merchandising features that may be invoked by sellers, and may monitor and track the success of merchandising strategies employed by sellers.

The network-based trading platform 230 itself, or one or more parties that transact via the network-based trading, platform 230, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Marketplace Data Structures

Figure 16:
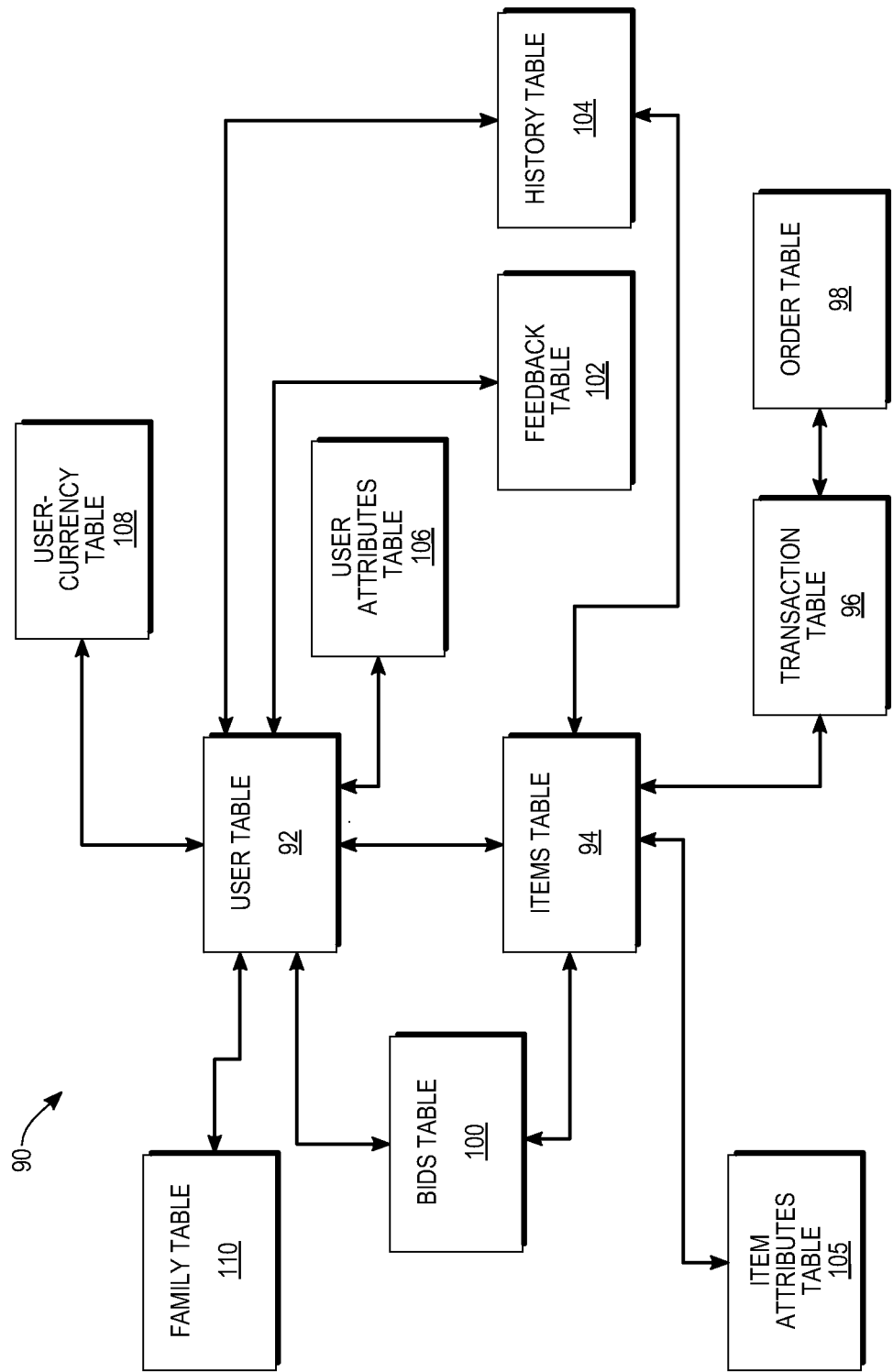
FIG. 16 is a high-level entity-relationship diagram, illustrating various tables that are utilized by and support the network-based trading platform and payment applications, according to an exemplary embodiment of the present invention.

FIG. 16 is a high-level entity-relationship diagram, illustrating various tables 90 that may be maintained within the databases 256, and that are utilized by and support the marketplace applications 250 and payment applications 252. While the exemplary embodiment of the present invention is described as being at least partially implemented utilizing a relational database, other embodiments may utilize other database architectures (e.g., an object-oriented database schema).

A user table 92 contains a record for each registered user of the network-based trading platform 230, and may include identifier, address and financial instrument information pertaining to each such registered user. A user may operate as a seller, a buyer, or both, within the network-based trading platform 230. In one exemplary embodiment of the present invention, a buyer may be a user that has accumulated value (e.g., commercial or proprietary currency), and is then able to exchange the accumulated value for items that are offered for sale by the network-based trading platform 230.

The tables 90 also include an items or listings table 94 in which are maintained item records for goods and services that are available to be, or have been, transacted via the network-based trading platform 230. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based trading platform 230 in connection with an auction-format listing supported by an auction application 44. A feedback table 102 is utilized by one or more reputation applications 50, in one exemplary embodiment, to construct and maintain reputation information concerning users. A history table 104 maintains a history of transactions to which a user has been a party. One or more attributes tables including an item attributes table 105 that records attribute information pertaining to items for which records exist within the items table 94 and a user attributes table 106 that records attribute information pertaining to users for which records exist within the user table 92.

Figure 17:
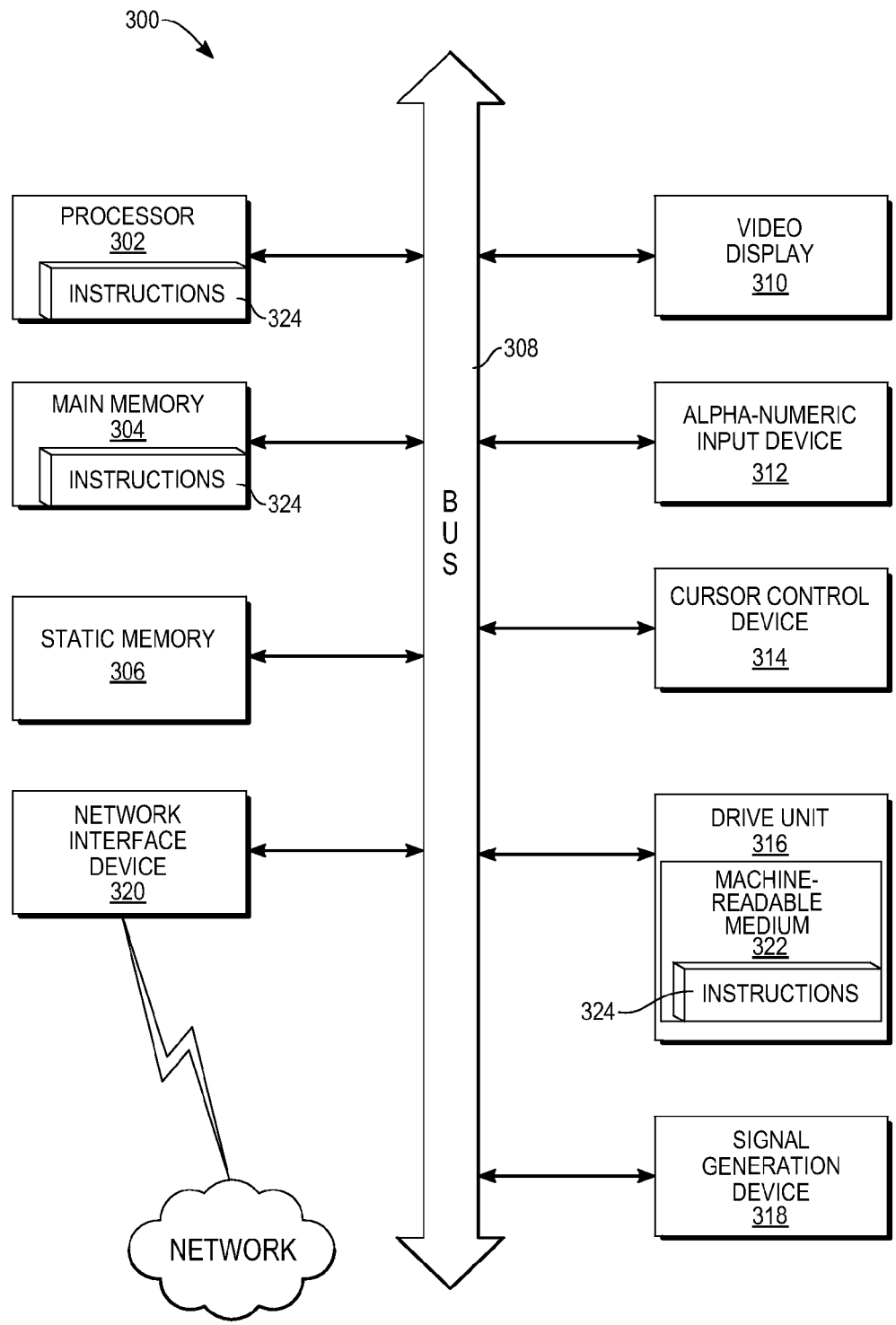
FIG. 17 illustrates a diagrammatic representation of a machine, in the exemplary form of a computer system, within which a set of instructions, for causing the machine to perform any one or more of the methodologies discussed herein, may be executed.

FIG. 17 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to facilitate a search of an information resource have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   at least one processor;
   an analyzing module implemented by the at least one processor and configured to:
   identify a distribution of a plurality of data items across a plurality of attribute value ranges corresponding to an attribute, the attribute being shared by at least two of the plurality of data items, the identifying including accessing a plurality of entries in a hash table, the hash table selected based on whether the attribute is a sub-range attribute or an exact-match attribute; and
determine that the distribution of the plurality of data items across the plurality of attribute value ranges includes at least two peaks; and
a communication module configured to, based on the determining that the distribution of the plurality of data items across the plurality of attribute value ranges includes the at least two peaks, communicate the distribution of the plurality of data items across the plurality of attribute value ranges corresponding to the attribute.

2. The system of claim 1, wherein the communication module further bases the communicating of the distribution of the plurality of data items across the plurality of attribute value ranges on a determination that the communication would better facilitate the filtering of the plurality of data items than a communication of an additional distribution, the additional distribution being a distribution of the data items across an additional plurality of attribute value ranges corresponding to the attribute.

3. The system of claim 2, wherein the determination that the communication would better facilitate the filtering of the plurality of data items than the communication of the additional distribution is based on a determination that the additional distribution has at least one of no modes, one mode, and no peaks.

4. The system of claim 1, wherein the communicating of the distribution of the plurality of data items across the plurality of attribute value ranges includes communicating a user interface that includes a plurality of attribute value selectors that correspond to the attribute value ranges.

5. The system of claim 4, wherein a selection of an attribute value selector of the plurality of attribute value selectors results in a filtering of the plurality of data items by the attribute value range corresponding to the attribute value selector.

6. A method comprising:
identifying a distribution of a plurality of data items across a plurality of attribute value ranges corresponding to an attribute, the attribute being shared by at least two of the plurality of data items, the identifying including accessing a plurality of entries in a hash table, the hash table selected based on whether the attribute is a sub-range attribute or an exact match attribute; and
determining that the distribution of the plurality of data items across the plurality of attribute value ranges includes at least two peaks;
based on the determining that the distribution of the plurality of data items across the plurality of attribute value ranges includes the at least two peaks, communicating the distribution of the plurality of data items across the plurality of attribute value ranges corresponding to the attribute.

7. The method claim 6, wherein the communicating of the distribution of the plurality of data items across the plurality of attribute value ranges is further based on a determination that the communication would better facilitate the filtering of the plurality of data items than a communication of an additional distribution, the additional distribution being a distribution of the data items across an additional plurality of attribute value ranges corresponding to the attribute.

8. The method of claim 7, wherein the determination that the communication would better facilitate the filtering of the plurality of data items than the communication of the additional distribution is based on a determination that the additional distribution has at least one of no modes, one mode, and no peaks.

9. The method of claim 6, wherein the communicating of the distribution of the plurality of data items across the plurality of attribute value ranges includes communicating a user interface that includes a plurality of attribute value selectors that correspond to the attribute value ranges.

10. A machine-readable storage medium storing a set of instructions that, when executed by at least one processor, causes the at least one processor to perform operations including:
identifying a distribution of a plurality of data items across a plurality of attribute value ranges corresponding to an attribute, the attribute being shared by at least two of the plurality of data items, the identifying including accessing a plurality of entries in a hash table, the hash table selected based on whether the attribute is a sub-range attribute or an exact-match attribute; and
determining that the distribution of the plurality of data items across the plurality of attribute value ranges includes at least two peaks; and
based on the determining that the distribution of the plurality of data items across the plurality of attribute value ranges includes the at least two peaks, communicating the distribution of the plurality of data items across the plurality of attribute value ranges corresponding to the attribute.

11. The machine-readable storage medium of claim 10, wherein the communicating of the distribution of the plurality of data items across the plurality of attribute value ranges is further based on a determination that the communication would better facilitate the filtering of the plurality of data items than a communication of an additional distribution, the additional distribution being a distribution of the data items across an additional plurality of attribute value ranges corresponding to the attribute.

12. The machine-readable storage medium of claim 11, wherein the determination that the communication would better facilitate the filtering of the plurality of data items than the communication of the additional distribution is based on a determination that the additional distribution has at least one of no modes, one mode, and no peaks.

13. The machine-readable storage medium of claim 10, wherein the communicating of the distribution of the plurality of data items across the plurality of attribute value ranges includes communicating a user interface that includes a plurality of attribute value selectors that correspond to the attribute value ranges.

14. The machine-readable storage medium of claim 13, wherein a selection of an attribute value selector of the plurality of attribute value selectors results in a filtering of the plurality of data items by the attribute value range corresponding to the attribute value selector.

* * * * *

UNITED STATES PATENT AND TRADEMARK OFFICE
CERTIFICATE OF CORRECTION

PATENT NO. : 8,954,411 B2  
APPLICATION NO. : 13/333982  
DATED : February 10, 2015  
INVENTOR(S) : Billingsley et al.

Page 1 of 1

It is certified that error appears in the above-identified patent and that said Letters Patent is hereby corrected as shown below:

In the claims

In column 15, line 45, in Claim 6, delete "exact match" and insert --exact-match--, therefor In column 15, line 55, in Claim 7, delete "method claim" and insert --method of claim--, therefor Signed and Sealed this
Third Day of November, 2015

Michelle K. Lee
*Director of the United States Patent and Trademark Office*